Feb. 21, 1939. R. U. THORNTON 2,148,394
SECTION OR WARPER BEAM
Filed July 12, 1932

INVENTOR:
Ray Udell Thornton
By Geo. K. Woodworth
ATTORNEY:

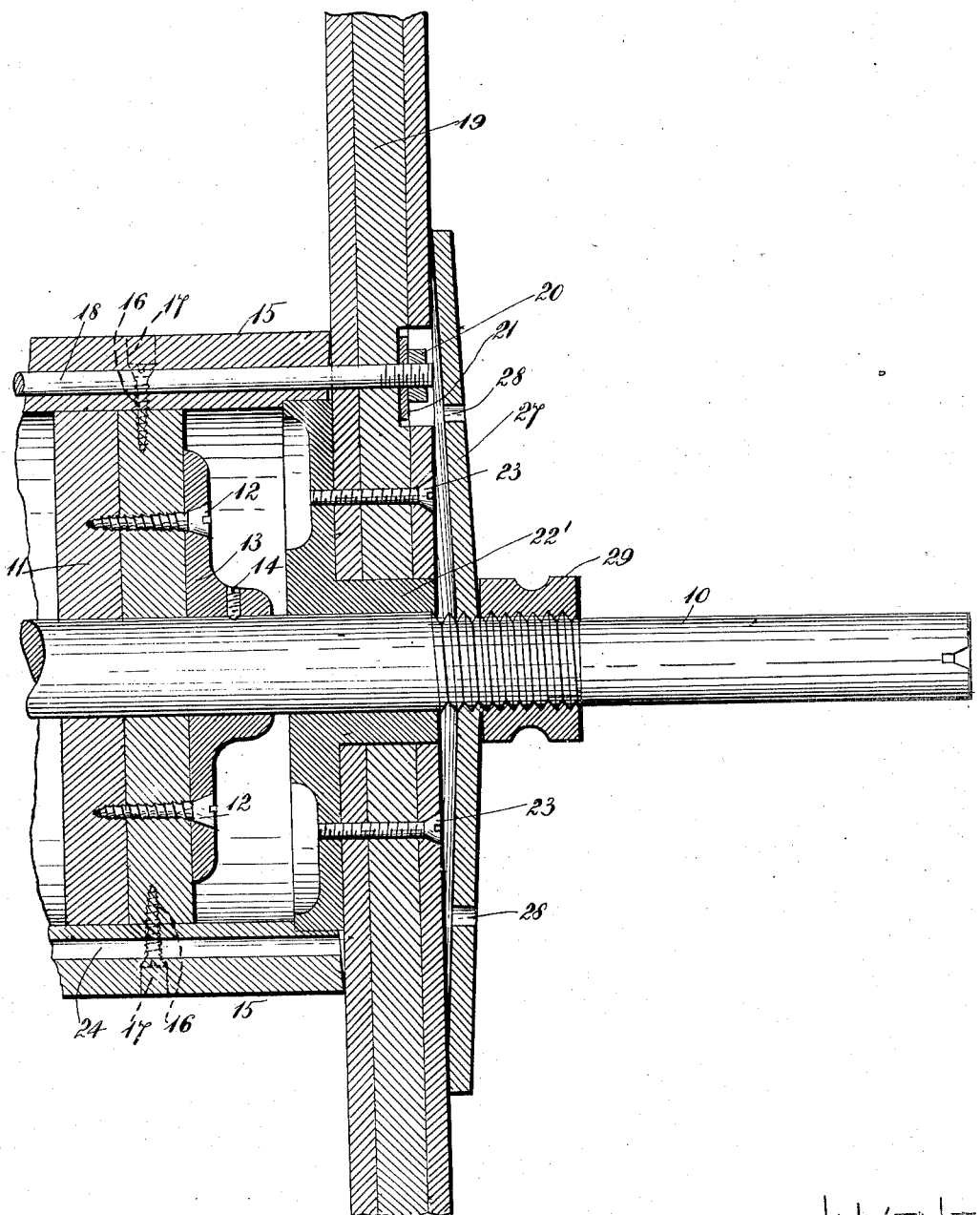

Patented Feb. 21, 1939

2,148,394

UNITED STATES PATENT OFFICE

2,148,394

SECTION OR WARPER BEAM

Ray Udell Thornton, New Bedford, Mass.

Application July 12, 1932, Serial No. 622,059

5 Claims. (Cl. 242—124)

The present invention which relates to section or warper beams is an improvement on Letters Patent Nos. 1,239,744, September 11, 1917, and 1,470,946, October 16, 1923 to Ray Thornton.

Heretofore it has been customary to secure the heads of such beams to the barrel portion thereof by means of nuts threaded to the shaft and taking against the heads; but experience has shown that such nuts are frequently loosened especially when there is a sudden stoppage or change in the speed of the beam, the heads of which rotate at high peripheral speed, such speed sometimes exceeding one hundred miles an hour. By means of the present invention I am enabled to eliminate the use of the nuts aforesaid by securing the heads directly to the barrel, the barrel directly to discs mounted on the shaft and said discs to said shaft by means of flanged collars or the like.

It has been found in practice that the heads, unless made excessively thick sometimes spread when the beam is filled with yarn. By the present invention I eliminate this defect by providing stiffeners which may take the form of convex discs preferably of resilient material, each disc having threaded engagement with the shaft and each being disposed with the outer periphery of its concave face in engagement with the outer face of one of the heads so that by screwing the disc along the shaft the stiffness will be forced against their respective heads and thereby prevent the longitudinal distance between the outer periphery of said heads becoming greater than the length of the barrel when yarn is wound on the beam. It is essential for this purpose that the diameter of each stiffener be substantially greater than that of the barrel.

Preferably the means of securing the heads to the staves which make up the barrel consist of longitudinal rods passing through said staves and heads together with nuts which give the same the necessary tension. I have found it desirable to place said rods in grooves which preferably are cut in one of the side faces of several of the staves and the latter may be connected together by tongue-and-groove construction.

An illustrative embodiment of my invention is shown in the accompanying drawings in which—

Fig. 3 is a fragmentary longitudinal section showing a modification.

Figure 1:
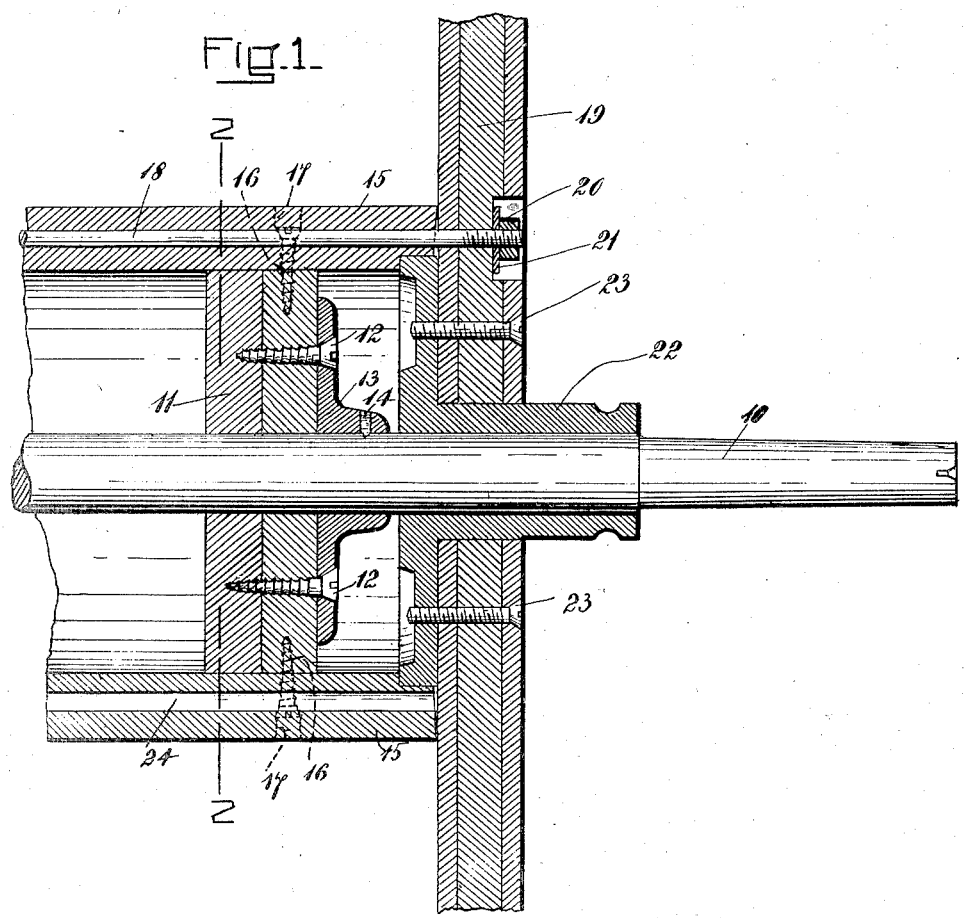
Figure 1 is a fragmentary longitudinal section of a beam embodying my invention.

In the particular drawings selected for more fully disclosing the principle of my invention, said drawings to be considered merely as illustrative and not as restrictive, 10 is a shaft on which are mounted several discs or pairs of discs 11, said discs preferably being of wood as shown. Usually three discs or pairs of discs are employed, one at or near the center of the barrel and the other two near the ends thereof. By means of wood screws 12 said discs are secured to the flanged collar 13 and the latter is rigidly connected to the shaft in any suitable manner as, for example, by set screws of which one is shown at 14. The barrel staves 15 are secured to the discs by means of screws 16 or in any other suitable manner which will provide a rigid construction. If screws are employed, each is preferably inserted through a counterbore which is then closed by a wooden plug 17, thus preserving the smooth surface of the barrel. Rods 18 pass through longitudinally-extending grooves in some or all of the staves and also through the heads 19, said rods being held from endwise movement and being properly tensioned by the nuts 20 threaded to the ends of said rods and taking against the washers 21 disposed in recesses cut in the outer face of the head.

Preferably the heads are of unitary or one-piece construction comprising three layers of wood secured together in the manner set forth in said Letters Patent 1,239,744, although it will be understood that the present invention is applicable to heads of any other construction.

Mounted on the shaft and extending through each head is a flanged sleeve or hub 22 to which, by means of machine screws 23, or other suitable means, the heads are rigidly secured. By interposing the hubs between the shaft and heads, a much larger bearing surface for the heads is obtained than if the latter were mounted directly on the shaft. This is advantageous in that it prevents enlargement or distortion of the central hole in the head which sometimes results when a heavy loaded beam which is mounted directly on the shaft comes forcibly in contact with a solid surface, as when such beam is dropped on a cement floor. The hub 22 serves also to maintain the concentricity of the barrel and the heads and is instrumental in transferring the weight of the yarn wound on the barrel to the center of the heads and thence to the floor or other support on which the beam is placed, thereby relieving strain on the shaft.

Figure 2:
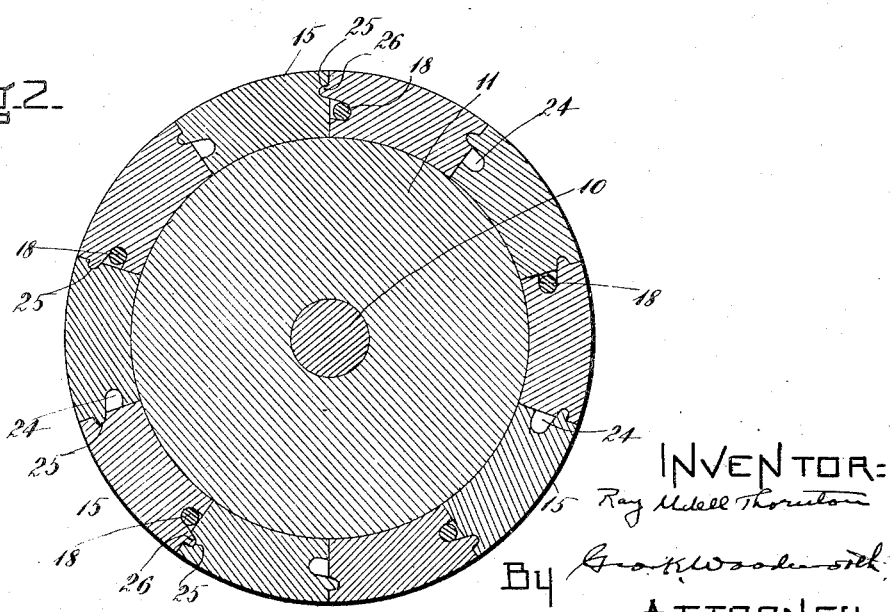
Fig. 2 is a transverse section taken on the line 2—2 of Fig. 1.

As indicated in Fig. 2 each stave has a longitudinally-extending groove 24 milled in one of its side faces for receiving a rod and the other side face thereof is provided with a groove 25 for receiving the tongue 26 formed on the face of the next adjacent stave. In Fig. 2 which shows ten staves although the number is not material, the grooves of every other stave is provided with a rod 18, although it will be understood of course that my invention is not limited to this relation between the number of rods and staves.

By means of the construction shown in Fig. 1 it is possible to dispense with the nuts heretofore employed for holding the heads against the barrel without any risk of relative movement between the heads and the barrel due to sudden changes in the speed of the revolving beam.

Referring to Fig. 3 the flanged sleeve or hub 22' does not pass through the head but is cut off flush with the outer face thereof and the ends of the shaft are threaded to receive the stiffeners 27 shown in the present instance as concave discs, preferably of resilient material, for example, hot rolled steel. Each disc is arranged with its convex surface outward with respect to the adjacent head and is substantially larger in diameter than the barrel. For example, if the barrel is 10" in diameter, the stiffener discs may be from 13" to 15" in diameter. By means of a spanner wrench taking into the holes 28, each disc may be turned up against the head with the necessary force to prevent the spreading of the outer peripheral portions of the latter and is held in adjusted position by the lock-nuts 29, said nuts 29 also serving as spacers when the beam is put on its own trunnions.

Having thus described illustrative embodiments of my invention without however limiting the same thereto, what I claim and desire to secure by Letters Patent is:

1. A section beam comprising a shaft, discs mounted on said shaft, staves spaced around said discs and forming a barrel, each of said staves being provided with a longitudinally-extending groove, a pair of heads mounted on said shaft, a plurality of rods each disposed in one of said grooves and passing through said heads, and means co-operating with said rods for drawing said heads against the ends of said barrel.

2. A section beam comprising a shaft, discs mounted on said shaft, staves spaced around said discs and forming a barrel, each of said staves having a longitudinally-extending groove in one of its side faces, a pair of heads mounted on said shaft, a plurality of rods each disposed in one of said grooves and passing through said heads and means co-operating with said rods for drawing said heads against the ends of said barrel.

3. A section beam comprising a shaft, discs mounted on said shaft, staves spaced around said discs and forming a barrel, one of the side faces of each of said staves being provided with a longitudinally-extending rod-receiving groove and a longitudinally-extending tongue, and the other side face of each of said staves having a longitudinally-extending tongue-receiving groove, a pair of heads mounted on said shaft, a plurality of rods each disposed in one of said rod-receiving grooves and passing through said heads, and means co-operating with said rods for drawing said heads against the end of said barrel.

4. A section beam comprising a shaft, a barrel and a pair of heads mounted on said shaft, a pair of discs each engaging the outer face of one of said heads and being independent of and separable from the latter and in threaded engagement with said shaft, each said disc being convex outwardly with respect to the head adjacent thereto and each being substantially larger in diameter than said barrel and means for locking each said disc against axial movement with respect to said shaft, whereby said heads are prevented from spreading when the beam is filled with yarn.

5. A section beam comprising a barrel, a shaft passing through the same, and a pair of heads mounted on said shaft, the ends of said shaft extending beyond said heads, a pair of discs each engaging the outer face of one of said heads and being independent of and separable from the latter, each said disc being convex outwardly with respect to the head adjacent thereto and each being substantially larger in diameter than said barrel and means for locking each said disc against axial movement with respect to said shaft, whereby said heads are prevented from spreading when the beam is filled with yarn.

RAY UDELL THORNTON.